Patented Mar. 31, 1925.

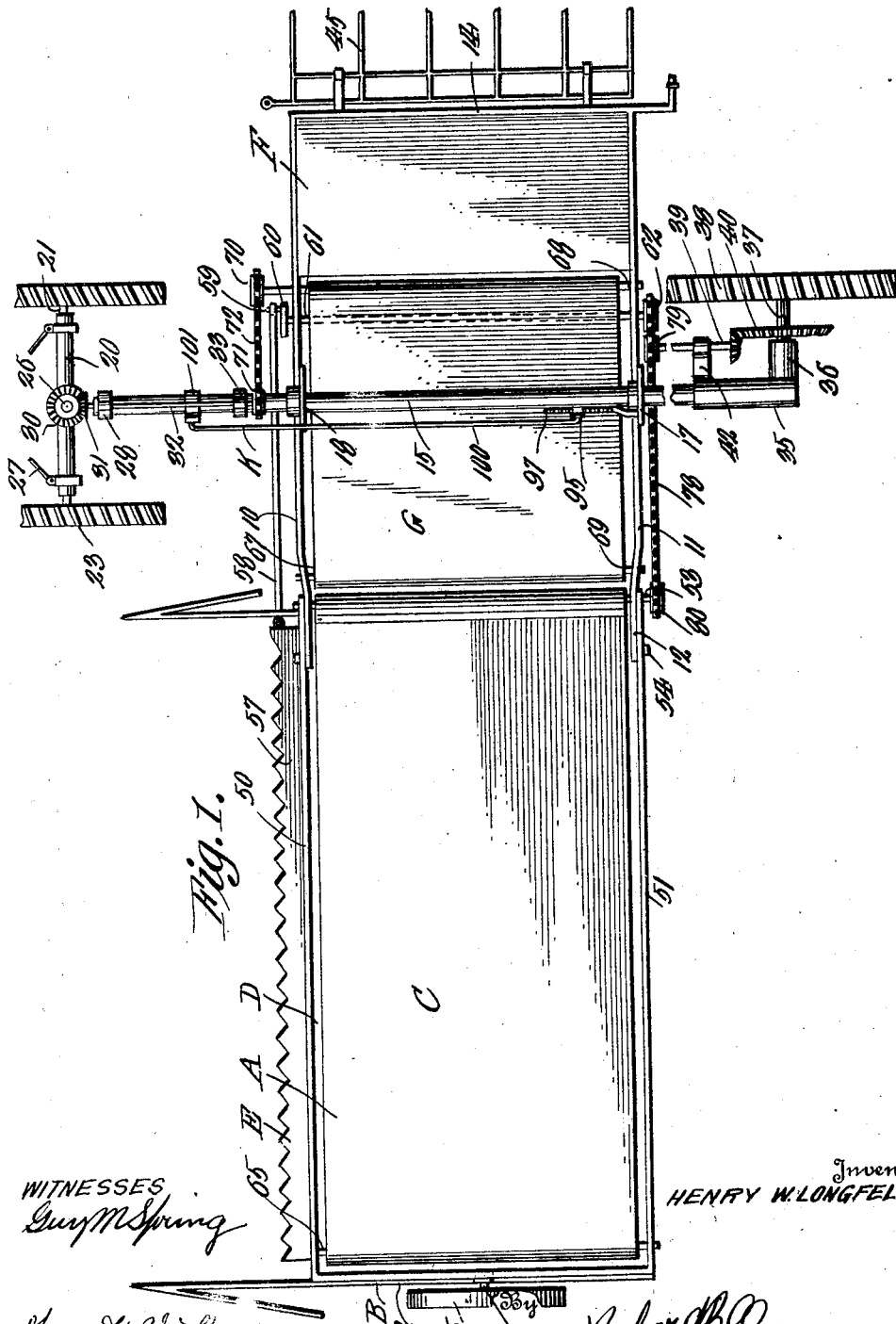

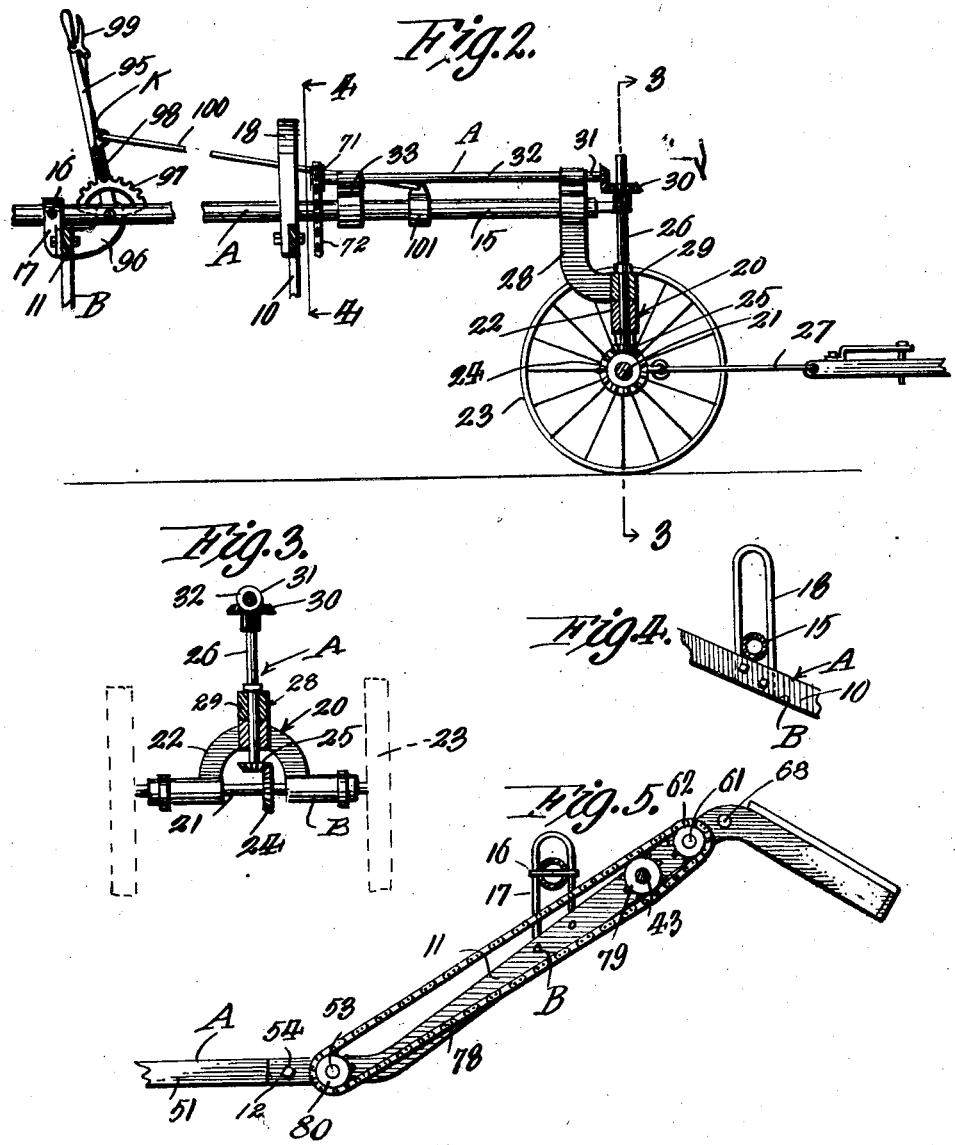

1,531,708

UNITED STATES PATENT OFFICE.

HENRY W. LONGFELLOW, OF BEDFORD, IOWA.

HARVESTER AND BINDER.

Application filed October 23, 1923. Serial No. 670,363.

*To all whom it may concern:*

Be it known that I, HENRY W. LONGFELLOW, a citizen of the United States, residing at Bedford, in the county of Taylor and State of Iowa, have invented certain new and useful Improvements in a Harvester and Binder, of which the following is a specification.

This invention appertains to vital improvements in harvesting machinery and the primary object of the present invention is to simplify the construction of harvesters and binders and to so construct the same that the harvester and binder will operate efficiently in wet fields and on windy days and thereby insure the harvesting of the grain under all conditions.

Another prime object of the present invention is to provide a harvester and binder in which the frame is carried by front and rear drive wheels, which effectively distribute the weight of the frame and parts thereon and form a positive means for insuring the correct and positive operation of the various parts of the machine under all conditions.

A further object of the invention is to provide means for operating a drive shaft from the front and rear drive wheels and novel means for operating the various parts of the machine from the drive shaft.

A futher object of the invention is to provide novel means for adjusting the height of the machine at the forward end thereof, so that the cutting mechanism can be readily raised and lowered for efficiently operating in fields of grain of different heights.

A still further object of this invention is to provide an improved harvester and binder of the above character, which is durable and efficient in use, one which is simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a plan view of the improved harvester and binder showing various parts thereof removed, such as the reel and binding mechanism for the bundles.

Figure 2 is a fragmentary vertical longitudinal section through the forward end of the harvester and binder showing the improved leading truck carried thereby and the means for operating a drive shaft from the ground wheels of the truck.

Figure 3 is a transverse vertical section through the truck taken on the line 3—3 of Figure 2.

Figure 4 is a fragmentary detail vertical section taken on the line 4—4 of Figure 2.

Figure 5 is a detail vertical section through the device.

Referring to the drawings in detail, wherein similar reference characters designate corresponding parts throughout the several views the letter A generally indicates the improved harvester and binder, which includes the frame B; the endless apron or belt C on the platform D; the grain cutting mechanism E; the binder deck F; the elevator belt or apron G; and the adjusting means K for adjusting the height of the forward end of the harvester and binder to govern the height of the cut of the grain.

The frame B comprises front and rear arched beams 10 and 11 the inner terminals of which are disposed in horizontal parallel relation and converge slightly toward each other to provide supporting arms 12 for the platform D. The outer terminals of the front and rear beams 10 and 11 are connected by a transverse beam 14 and the same can be braced in any other desired way.

A hollow beam 15 is disposed across the frame defined by the beams 10 and 11 and extends forwardly thereof. This hollow beam 15 is of a tubular construction and can be formed of a pipe presenting the necessary strength if so desired. The forwardly extending hollow beam 15 adjacent to its rear end, is connected by means of a pivot pin 16 to a bracket 17 bolted or otherwise secured to the rear beam 11. The forward beam 10 supports a loop shaped guide bracket 18 which slidably receives the said hollow beam 15. The extreme forward end of the hollow beam 15 is supported on the forward truck 20, which comprises a drive axle 21 rotatably supported in a suitable bolster 22. The terminals of the drive axle 21 have keyed or otherwise secured thereto the ground and drive wheels 23. A beveled drive gear 24 is keyed or otherwise secured to the axle 21 and meshes with a smaller beveled gear 25, which is keyed or otherwise secured to a vertically extending drive shaft 26 rotatably carried by the bolster 22. The bolster 22 carries any preferred type of draft appliance 27, for permitting the harvester and binder to be drawn across a field. It is to be understood that draft animals can be used for drawing the harvester and binder across a field or that a tractor can be used for this purpose. A casting 28 is carried by the forward end of the hollow beam 15 and the forward end of the casting carries a bearing 29 which is slidably mounted upon the vertical drive shaft 26 and thus it can be seen that the forward end of the frame B is free to ride up and down on the said shaft. The shaft 26 has feathered thereon for sliding movement a beveled gear 30, which in turn meshes with a beveled gear 31, that is keyed or otherwise secured to a driven shaft 32. This driven shaft 32 is rotatably carried by suitable bearings 33 carried by the hollow beam 15.

A casting 35 is carried by the extreme rear end of the beam 15 and is disposed in rear of the rear beam 11 and this casting supports a bearing 36 for the rear drive axle 37 which carries a ground rear drive wheel 38. The casting 36 also carries bearings for a drive shaft 39, which is connected by means of gearing 40 with the drive axle 37. A bearing 42 disposed at right angles to the bearing supporting the shaft 39 is also formed on the casting 36 and rotatably supports the forwardly extending drive shaft 39.

The frame B at the outer end thereof has connected thereto any preferred type of bundle carrier 45 which receives the bundle from the deck F.

The platform D which carries the endless belt or apron C comprises front and rear beams 50 and 51 which are connected at their outer ends by means of a transversely extending connecting beam 52. The beams 50 and 51 may be braced in any other preferred way and carry the usual pan disposed below the belt or apron C. The beams 50 and 51 have their inner ends disposed in abutting relation to the arms 12 of the front and rear beams 10 and 11 of the frame B and are rotatably mounted on the inner shaft which carries the inner roller for the apron C. When it is desired to hold the platform D in an extended rigid position in relation to the frame B, suitable bolts 54 are employed for connecting the beams 50 and 51 with the arms 12 and when it is desired to fold the platform over the frame B these bolts are removed, and the platform swung on the shaft 53. A suitable supporting or grain wheel 55 is rotatably mounted on a stub axle 56 carried by the beam 52.

The grain cutting mechanism E is carried by the forward or front end of the platform D and can be of any preferred type and embodies the usual reciprocatory tooth cutting bar 57, which is reciprocated, by means, which will be hereinafter more fully described. As shown however, the inner end of the reciprocatory cutting knife 57 has pivotally connected thereto the pitman rod 58, operatively connected to the crank pin 59 formed on the crank wheel 60, which is keyed or otherwise secured to a driven shaft 61 rotatably mounted in suitable bearings carried by the front and rear beams 10 and 11 of the frame B. The rear end of this shaft has keyed or otherwise secured thereto a suitable sprocket wheel 62, which is connected to the drive mechanism, as will be hereinafter more fully described. The beams 50 and 51 of the platform D adjacent to their outer ends carry a shaft 65, which is arranged in parallel relation to the shaft 53 and this shaft also has mounted thereon a suitable roller and the apron or conveying belt C is trained about the rollers carried by the said shaft 65 and the shaft 53 and acts as means for conveying the cut grain to the elevator apron G, which is disposed between the conveyor or apron C and the binder deck F.

As clearly shown in Figure 5 of the drawings the elevator apron D is disposed at the upwardly inclined portion of the frame bars 10 and 11 while the deck F is secured to the downwardly inclined portions of the arch frame bars or beams 10 and 11. The deck F can be made of sheet metal or any other material desired. The endless elevator belt or apron G is trained about suitable rollers 67 keyed or otherwise secured to upper and lower shafts 68 and 69 rotatably carried by the said frame bars or beams 10 and 11. It is to be understood that suitable flights can be secured to the elevator belt or apron G if so desired. The upper shaft 68 has keyed or otherwise secured thereto a sprocket wheel 70 which is in transverse alignment with a sprocket wheel 71 keyed or otherwise secured to the rear end of the driven shaft 32 and these sprocket wheels 70 and 71 are connected by a drive sprocket chain 72. By this mechanism it can be seen that the elevator apron or belt G is operated.

The shaft 39 rotatably carried by the casting 35, has keyed or otherwise secured thereto a drive sprocket wheel 79, which meshes with the drive sprocket chain 78 and thus it can be seen that the conveyor belt or apron C and the cutting mechanism E is operated from the rear ground wheel 37. It is to be also noted that the rear end of the shaft 53 carries a drive sprocket wheel 80, which is in alignment with the sprocket wheel 62 and these wheels receive the drive sprocket chain 78.

The means K for bringing about the elevation of the forward end of the frame B, so as to govern the height of the cut of the grain comprises an operating lever 95 which is pivotally secured to a suitable supporting bracket 96 carried by the rear beam 11.

This bracket 96 also carries a sector rack 97, which is adapted to be engaged by a dog 98 carried by the said lever. A suitable operating handle 99 is carried by the lever for bringing about the manipulation of said dog. The operating lever 95 at a point above its pivot has pivotally connected thereto the forwardly extending rod 100, which is pivotally connected to a cuff 101 connected with the beam 15 in rear of the casting 28. Now it can be seen that by pushing the lever forwardly or rearwardly, that the casting 28 will be slid on the shaft 26, thus bringing about the adjusting of the forward end of the frame. If so desired the casting 28 or beam 15 can carry a suitable bearing for rotatably receiving the beveled gear 30 in order to permit the raising and lowering of the said gear during the raising and lowering of the frame.

In the drawings, I have only shown the parts of the harvester and binder to which my invention relates, but it is to be understood of course that the same carries the ordinary reel and binding mechanism.

In operation of the improved harvester and binder, the same is drawn across the field in the ordinary manner, as the weight will be effectively carried by the front truck 20 and the rear bull wheel 38, which distributes the weight of the machine over a relatively wide area and thus permits the device to travel in soft or marshy ground. As the machine is drawn across the field the front and rear drive wheels 23 and 38 are rotated, which in turn imparts movement to the drive shaft 32 at the front of the device and the drive shaft 39 at the rear of the device, which operates various parts of the mechanism as heretofore described.

From the foregoing description, it can be seen that I have provided an exceptionally simple and durable harvester, and binder, which will effectively operate under all existing conditions.

Changes in details may be made without departing from the spirit or the scope of the invention.

What I claim as new is:

1. In a harvester and binder, a main frame including front and rear parallel disposed arched beams, a forwardly extending beam connected with the front and rear beams, a rear drive wheel associated with the forwardly extending beam, front drive wheels associated with the forward end of the forwardly extending beam, a cutting mechanism carried by the outer end of the frame, a conveyor belt arranged in rear of the cutting mechanism for carrying the cut grain inwardly of the frame, an elevator belt carried by the frame for receiving the grain from the conveyor belt, a deck carried by the frame for receiving the cut grain from the elevator, bundle carriers carried by the deck, and means operatively connecting the front and rear drive wheels with the conveyor, elevator and cutting mechanism.

2. In a harvester and binder, a main frame including front and rear arched beams, a platform pivotally connected to the beams, a cutting mechanism carried by the platform, an endless conveyor apron carried by the platform and disposed in rear of the cutting mechanism, a deck carried by the outer ends of the beams, an elevator apron disposed between the conveyor and deck for delivering cut grain to the deck, a forwardly extending longitudinally disposed main beam connected with the front and rear arched beams, a truck pivotally associated with the forward end of the longitudinally extending main beam including drive wheels a rear ground drive wheel supporting the rear end of the main longitudinally extending beam, means operatively connecting the rear drive wheel with the conveyor, means operatively connecting the elevator apron with the front drive wheels and means for operating the cutting mechanism from the driving mechanism for the endless conveyor apron.

3. In a harvester and binder, a frame including front and rear arched beams, a main longitudinally extending beam connected with the arched beams, a casting carried by the forward end of the longitudinally extending beam, a truck rotatably supported by the casting including drive ground wheels, a rear casting carried by the longitudinally extending beam, a rotatable drive ground wheel supporting the rear casting, a deck connected with the front and rear arched beams, a platform pivotally carried by the outer ends of the arched front and rear beams, a cutting mechanism carried by the platform, an endless conveyor apron carried by the platform and disposed in rear of the cutting mechanism, an endless elevator apron carried by the frame and arranged intermediate the conveyor apron and the deck, a driven shaft disposed in parallel relation to the longitudinally extending beam, means operatively connecting the driven shaft with the drive wheels carried by the front truck, means operating the elevator apron from said driven shaft, a driven shaft carried by the rear casting, means operatively connecting the driven shaft carried by the rear casting with the rear drive wheel, means operatively connecting the driven shaft carried by the rear casting with the endless conveyor apron, and means operatively connecting the cutting mechanism with said driven shaft carried by the rear casting.

4. In a harvester and binder, a main frame including front and rear arched bars, a longitudinally extending beam connected with the arched bars, a front wheel truck connected with the forward end of the longitudinally extending beam, a rear drive wheel connected with the rear end of the longitudinally extending beam, a platform, means pivotally connecting the inner end of the platform with the inner end of the frame to permit the platform to be swung over the frame, means for rigidly holding the frame against movement, a ground wheel carried by the outer end of the platform, a cutting mechanism carried by the platform, an endless conveyor apron carried by the platform and disposed in rear of the cutting mechanism, a deck carried by the frame, an endless elevator apron disposed intermediate the conveyor apron and deck, and means for operating the conveyors, elevators, and cutting mechanism from the ground wheels.

5. In a harvester and binder, front and rear arched beams, a longitudinally extending beam, means pivotally connecting the longitudinally extending beam adjacent to its rear end to the rear arched beam, means slidably connecting the longitudinally extending beam with the front arched beam, a front truck including a bolster, a drive axle rotatably carried by the bolster, drive wheels secured to the axle, a vertically disposed drive shaft carried by the bolster, means operatively connecting the drive shaft with the drive axle, a casting carried by the forward end of the longitudinally extending beam and slidably mounted upon the vertical drive shaft, means for raising and lowering the casting upon the vertical shaft, a platform, a cutting mechanism carried by the platform, means connecting the platform with the beams for movement therewith, a deck, a conveyor carried by the platform and arranged in rear of the cutting mechanism, an elevator apron carried by the frame and arranged between the conveyor apron and the deck, a casting carried by the rear end of the longitudinally extending beam, a rotatable ground engaging wheel supporting the last mentioned casting, and means operatively connecting the ground engaging wheels with the conveyor, elevator and cutting mechanism.

In testimony whereof I affix my signature in presence of two witnesses.

HENRY W. LONGFELLOW.

Witnesses:
 ARTHUR DINWIDDIE,
 JOHN P. CONGER.